US005982980A

United States Patent [19]

Tada

[11] Patent Number: 5,982,980

[45] Date of Patent: Nov. 9, 1999

[54] KARAOKE APPARATUS

[75] Inventor: Yukio Tada, Hamamatsu, Japan

[73] Assignee: Yamaha Corporation, Hamamatsu, Japan

[21] Appl. No.: 08/924,550

[22] Filed: Aug. 27, 1997

[30] Foreign Application Priority Data

Aug. 30, 1996 [JP] Japan .................................... 8-229941

[51] Int. Cl.$^6$ ...................................................... H04N 5/938

[52] U.S. Cl. ......................... 386/96; 386/126; 434/307 A

[58] Field of Search ................................. 386/39, 45, 96, 386/98, 99, 97, 101, 102, 103, 104, 105, 106, 125, 126; 434/307 A

[56] References Cited

U.S. PATENT DOCUMENTS

| | | | |
|---|---|---|---|
| 5,247,126 | 9/1993 | Okamura et al. | 386/97 |
| 5,486,645 | 1/1996 | Suh et al. | 386/102 |

*Primary Examiner*—Wendy Garber
*Assistant Examiner*—Christopher Onuaku
*Attorney, Agent, or Firm*—Pillsbury Madison & Sutro LLP

[57] ABSTRACT

In addition to a music piece data file in which music piece data for a karaoke performance are stored, a BGP script file in which BGP script data (picture sequence data) are stored, and a picture data file in which plural still picture data are stored are disposed. The BGP script data describe the procedure of combining still picture data and switchingly displaying the synthesized data, and include music piece corresponding data corresponding to a specific music piece data, and genre corresponding data corresponding to the genre of a music piece. During a karaoke performance of a music piece, when a music piece corresponding data corresponding to the music piece exists, an image is displayed by using the data, and, when such a data does not exists, an image is displayed by using a data corresponding to the genre of the music piece. When a data corresponding to the genre does not exists or cannot be used, background still picture data corresponding to the genre are switchingly displayed.

3 Claims, 9 Drawing Sheets

FIG. 3

CORRESPONDING MUSIC PIECE NUMBER
(CORRESPONDING GENRE CODE)

tn: SWITCHING TIME

En: KIND OF EFFECT xe, ye: CENTER OF EFFECT

Tn: TIME PERIOD REQUIERED FOR EFFECT

Bn: IDENTIFICATION NUMBER OF BACKGROUND STILL PICTURE

Fn: IDENTIFICATION NUMBER OF FOREGROUND STILL PICTURE xf:yf: COORDINATES OF DISPLAY OF FOREGROUND

Ha:Sa:La: CORRECTING VALUES OF TONE COLOR 1378-21, 01 t1:B1:F1:x1:y1 t2:E1:0.0:T1_:B1:F2:x2:y2:-30:-50:40 t3:B2:F3:x3:y3 t4:E2:0.0:T3_:B2:F1:x4:y4:0:0:0

BACKGROUND STILL PICTURE NUMBER,
GENRE CODE, ARRANGE HSL (Hb, Sb, Lb)

FOREGROUND STILL PICTURE NUMBER,
ARRANGE HSL (Hf, Sf, Lf)

KARAOKE APPARATUS

BACKGROUND OF THE INVENTION

1. Field of the Invention

The invention relates to a karaoke apparatus which can supply an image synchronized with a karaoke performance to a monitor so as to be displayed thereon.

2. Prior Art

At present, many karaoke apparatuses are respectively connected to monitors. An image corresponding to a music piece, and words are displayed on the monitor in synchronization with a karaoke performance. A karaoke apparatus having a tone generator is currently mainly used. Such a karaoke apparatus comprises optical disks on each of which image data of motion pictures are stored in addition to music piece data for a karaoke performance. An image corresponding to a music piece to be performed is selected from the optical disks and then reproduced.

However, a karaoke apparatus provided with such a changer has drawbacks that the cost is high, and that the apparatus is increased in size and weight and hence inadequate for a portable use. The karaoke apparatus has a further drawback that the mechanisms for exchanging and reproducing optical disks are increased in number and hence a fault frequently occurs.

Recently, a portable karaoke apparatus in which still pictures are stored in a hard disk and the pictures are displayed on a monitor during a karaoke performance has been practically used. However, such an apparatus has a drawback that the displayed picture is monotonous and hence the atmosphere of a karaoke performance cannot be enhanced.

SUMMARY OF THE INVENTION

It is an object of the invention to provide a karaoke apparatus which, even when a still picture is used, can realize an image display that is full of variety.

There is provided a karaoke apparatus which comprises a music piece data file for storing plural music piece data, and which reads out a designated music piece data from the music piece data file and executes a performance of a karaoke music piece, wherein the apparatus further comprises: performance music piece designating means for designating a music piece to be performed; picture storing means for storing plural background still picture data and plural foreground still picture data; picture sequence data storing means for storing plural picture sequence data in which plural picture designating data are arranged in time series, in correspondence with the plural music piece data, each of the picture designating data simultaneously designating one background still picture data and one or plural foreground still picture data; and an index file which designates a music piece data and a picture sequence data which correspond to a music piece designated by the performance music piece designating means, a karaoke music piece is performed by reading a music piece data designated by the index file, and the apparatus further comprises picture synthesizing means for reading a picture designating data on the basis of a picture sequence data which is designated by the index file, combining a background still picture data and a foreground still picture data which are designated by the picture designating data, thereby producing a display still picture data, and supplying the display still picture data to a monitor.

There is provided a karaoke apparatus which stores plural music piece data respectively corresponding to music pieces, each of the music piece data including a genre data and a performance sequence data of a corresponding music piece, and which executes a performance of a karaoke music piece by reading out a designated music piece data, wherein the apparatus comprises: picture storing means for storing plural background still picture data and plural foreground still picture data; picture sequence data storing means for storing plural picture sequence data in which plural picture designating data are arranged in time series, in correspondence with the plural music piece data, each of the picture designating data simultaneously designating one background still picture data and one or plural foreground still picture data; picture sequence data selecting means for, when a music piece data is designated, retrieving a picture sequence data corresponding to the music piece data from the picture sequence data storing means, and, if the picture sequence data exists, selecting the picture sequence data, and, if the picture sequence data does not exist, retrieving a picture sequence data corresponding to the genre of the music piece data from the picture sequence data storing means, and selecting the picture sequence data; and picture synthesizing means for, in parallel with a performance of the karaoke music piece, reading a picture designating data from the selected picture sequence data, combining a background still picture data and a foreground still picture data which are designated by the picture designating data, thereby producing a display still picture data, and supplying the display still picture data to a monitor.

There is provided a karaoke apparatus wherein each of the background still picture data is provided with a genre data, and the apparatus further comprises temporary picture supplying means for, when a picture sequence data corresponding to the genre of the designated music piece data does not exist in the picture sequence data storing means, or when the picture sequence data cannot be used, supplying background still picture data corresponding to the genre of the music piece data to the monitor, while suitably switching over the background still picture data.

According to the present invention, the karaoke apparatus comprises: the music piece data file for storing plural music piece data; the picture storing means for storing plural background still picture data and foreground still picture data; the picture sequence data storing means for storing plural picture sequence data in correspondence with the plural music piece data; and the index file which designates a music piece data and a picture sequence data in correspondence with a karaoke music piece. When a karaoke performance music piece is designated, a music piece data designated in the index file is read out from the music piece data file, and a karaoke performance is then executed. In parallel with the performance of the karaoke music piece, a display still picture data which is produced by combining a background still picture data and a foreground still picture data on the basis of the picture sequence data designated in the index file is displayed on the monitor. In this way, the music piece data for a performance, the picture sequence data for a picture display, the still picture data, and the index file are formed as different files. Therefore, music pieces and pictures can be freely combined with each other, and the data files can be independently maintained. Even when a part of the data is destroyed, it is required only to rewrite the data which is broken (the music piece data or the picture data), and hence the maintenance can be easily conducted. Furthermore, usual music piece data which do not contain picture data can be used as they are.

According to the present invention, the picture sequence data storing means stores plural picture sequence data corresponding to a specific music piece data, and plural picture sequence data corresponding to a specific genre. When a karaoke performance of a music piece data is designated, a picture sequence data corresponding to the music piece data is retrieved from the picture sequence data storing means. If the data exists, a picture is displayed on the basis of the data. If the picture sequence data corresponding to the music piece does not exist, a picture sequence data corresponding to the genre of the music piece data is retrieved from the picture sequence data storing means, and a picture is displayed on the basis of the data. Therefore, even when music piece data having a picture sequence data corresponding to a music piece, and those not having such a data exist mixedly, a picture can be displayed in parallel with a karaoke performance for all music pieces.

According to the present invention, in the above-mentioned configuration, when a picture sequence data corresponding to the genre of a music piece does not exist, or when the picture sequence data corresponding to the genre cannot be used, several background still pictures corresponding to the genre of the music piece are selected, and the background still pictures are displayed on the monitor while the pictures are suitably switched. Even when still pictures cannot be subjected to synthesization and sequencing due to a picture sequence data, a picture which is not incongruous to the music piece can be displayed as an emergency countermeasure. The case where a picture sequence data cannot be used includes that background still picture data and foreground still picture data which are to be used in the picture sequence are partly broken.

BRIEF DESCRIPTION OF THE DRAWINGS

FIG. 3 is a diagram showing an example of the configuration of a BGP script data stored in the hard disk drive;

DETAILED DESCRIPTION OF THE PREFERRED EMBODIMENTS

Figure 1:
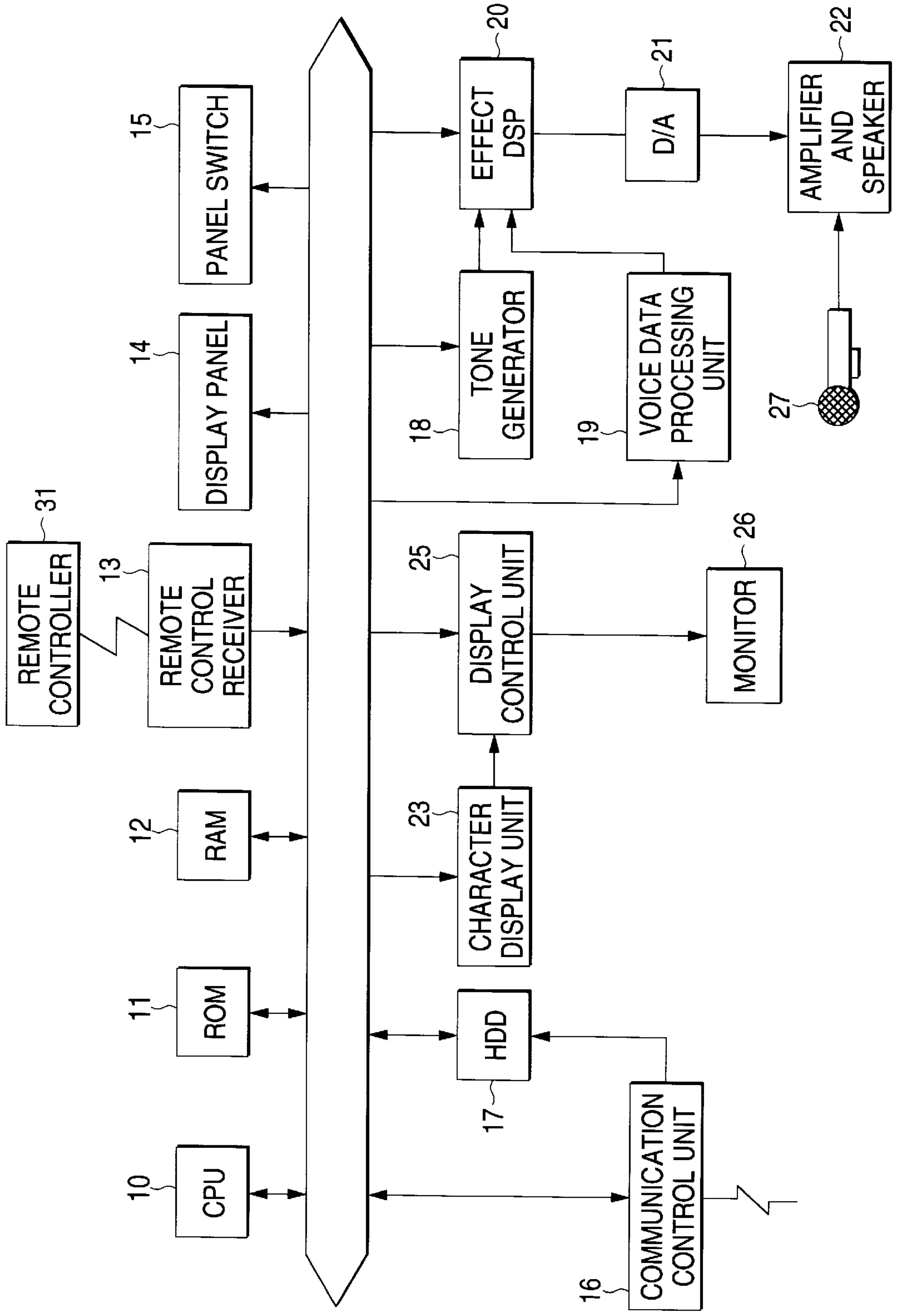
FIG. 1 is a block diagram of a karaoke apparatus which is an embodiment of the invention.

FIG. 1 is a block diagram of a karaoke apparatus which is an embodiment of the invention. The karaoke apparatus is a small-sized karaoke apparatus, and the whole of the apparatus including a monitor 26 and an amplifier and speaker 22 is mounted on a wagon which can be moved by means of casters. In the karaoke apparatus, a tone generator 18 and the like are driven in accordance with a music piece data selected by a karaoke singer so as to execute a karaoke performance and display a picture and words on the monitor 26. The picture displayed on the monitor 26 is not a motion picture but display still pictures which are switchingly displayed and each of which is obtained by combining plural still pictures. The switching display is conducted on the basis of a BGP (BackGround Picture) script data which is a picture sequence data. The data of the still pictures include background still picture data and foreground still picture data. Plural background and foreground still picture data are stored in a hard disk drive 17. The display still picture data is produced by combining a foreground still picture data with one background still picture data. The display still picture data is switched to another one in accordance with the progress of the music piece, thereby producing an effect similar to that which is attained by a motion picture. In order to prevent the color tone (hue, saturation, and lightness) of the foreground still picture data from being mismatched with that of the background still picture data which is to be used as a background, the color tones of the two picture data may be corrected so as to become closer.

In the karaoke apparatus, a ROM 11, a RAM 12, the hard disk drive (HDD) 17, a remote control receiver 13, a display panel 14, panel switches 15, a communication control unit 16, the tone generator 18, a voice data processing unit 19, an effect DSP 20, a character display unit 23, and a display control unit 25 are connected via a bus to a CPU 10 which controls the operation of the whole apparatus.

Figure 2:
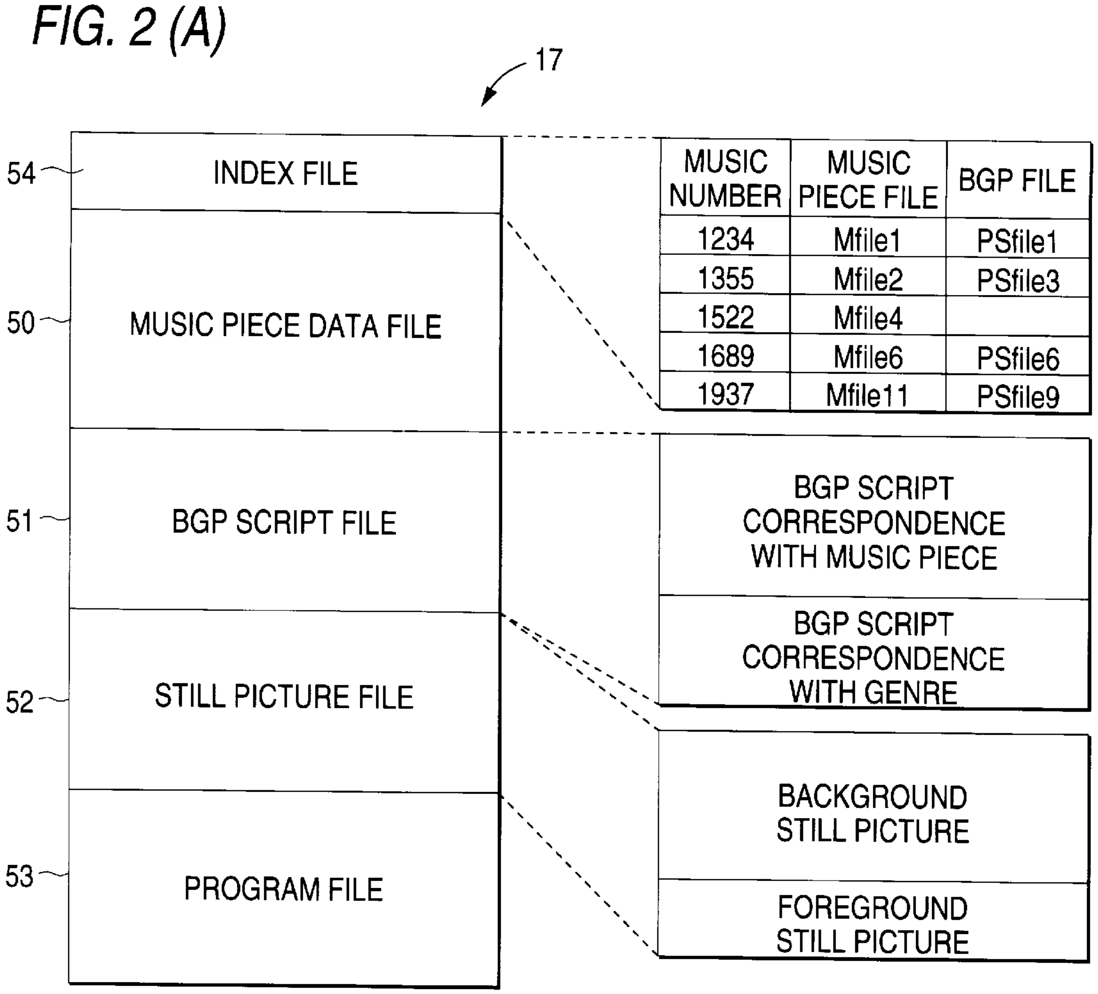
FIG. 2 is a diagram showing the stored contents of a hard disk drive of the karaoke apparatus.
Figure 2:
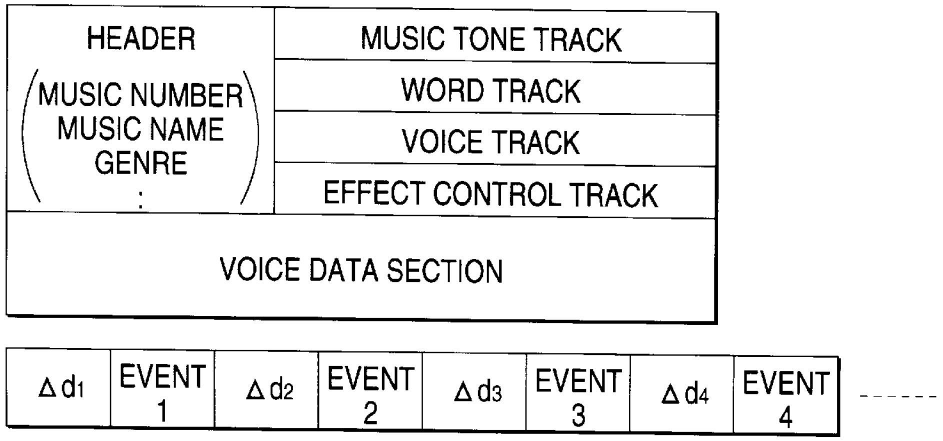

The ROM 11 previously stores programs such as an activation program for activating the apparatus. Programs such as a system program which controls the operation of the apparatus and application programs are stored in the HDD 17. When the apparatus is powered on, the programs are loaded into the RAM 12. In addition to an area for storing the programs, an execution data storing area into which music piece data for executing a karaoke performance are to be written are previously set in the RAM 12. The HDD 17 has a memory capacity of about 700 to 800 MB. In the HDD, as shown in FIG. 2, disposed are the program storage area 53, a music piece data file 50 in which music piece data of 3,000 to 4,000 music pieces are stored, a BGP script file 51 in which sequences of still pictures to be combinedly displayed in accordance with a music piece data are stored, a still picture file 52, an index file 54, and the like. The index file 54 is a file in which music piece data and BGP script data are stored in correspondence with music piece numbers (performance music pieces). When the singer designates one music piece number, the index file 54 is searched and a music piece data and a BGP script data which are to be read out are designated. All the files can be updated by means of, for example, distribution from the center station. As described above, the karaoke apparatus is a movable one. When the karaoke apparatus is to be subjected to maintenance, however, the apparatus is connected with the center station via a telephone line. The communication control unit 16 exhibits a function of communication with the center station via a telephone line, and writes programs and various data distributed from the center station into the HDD 17.

The remote control receiver 13 receives an infrared signal transmitted from a remote controller 31, and reconstructs data. The remote controller 31 comprises command switches such as a music-piece selection key and numerical key switches. When the user operates the switches, an infrared ray signal which is modulated by a code in accordance with the operation is transmitted. The display panel 14 is disposed on the front face of the karaoke apparatus, and used for displaying the code of a music piece which is currently performed, and the number of reserved music pieces. The panel switches 15 are disposed in a front operating portion of the karaoke apparatus and include a music piece code input switch, a key change switches, and the like.

The tone generator 18 produces musical-tone signals based on data of a musical-tone track of the music piece data. The music piece data is read out by the CPU 10 during a karaoke performance. As shown in FIG. 2(B), a musical-tone track consists of plural tracks. The tone generator 18 produces musical-tone signals of plural parts at the same time on the basis of the data. The voice data processing unit 19 produces a voice signal of a designated length and a designated pitch, on the basis of a voice data included in the music piece data. The voice data is obtained by converting a signal waveform (such as a back chorus) which is difficult to be electronically generated by the tone generator 18, as it is into an ADPCM data, and then stored. The musical-tone signals produced by the tone generator 18, and the voice signal produced by the voice data processing unit 19 constitute karaoke performance sounds. The signals are supplied to the effect DSP 20. The effect DSP 20 imparts effects such as reverberation, and echo to the karaoke performance sounds. The karaoke performance sounds to which effects are imparted are converted into an analog signal by a D/A converter 21 and then supplied to the amplifier and speaker 22. The amplifier and speaker 22 amplifies the supplied karaoke performance sounds and a singing voice signal supplied from a microphone 27, imparts effects such as echo to the sing voice signal, and outputs the amplified signals as a sound through the speaker.

During the karaoke performance, the character display unit 23 generates character patterns of a title of a music piece, words, and the like, based on character data read out from the music piece data (see FIG. 2). The CPU 10 reads out predetermined background and foreground still picture data from the picture data file of the HDD 17 on the basis of the corresponding BGP script data, combines the data with each other, and supplies the combined data as the display still picture data to the display control unit 25. The character patterns and the display still picture data are combined with each other in the display control unit 25, and then displayed on the monitor 26. The function of combining still picture data will be described later in detail.

Figure 4:
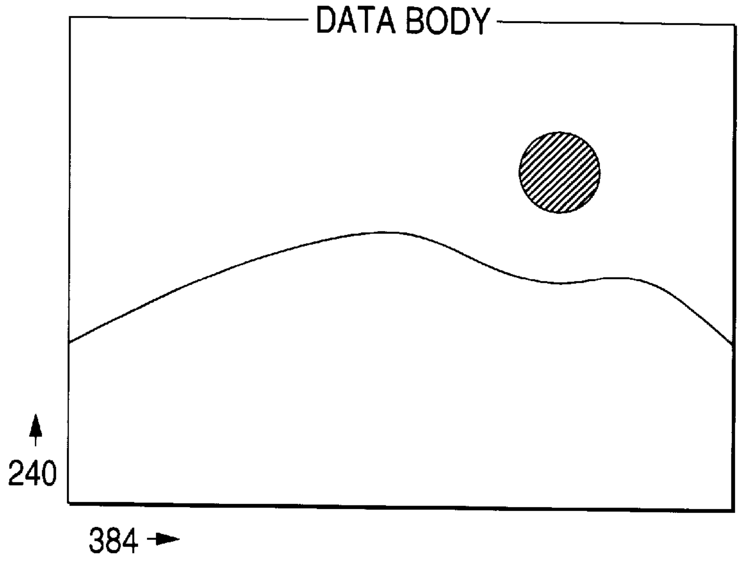
FIG. 4 is a diagram showing examples of background and foreground still picture data stored in the hard disk drive.
Figure 4:
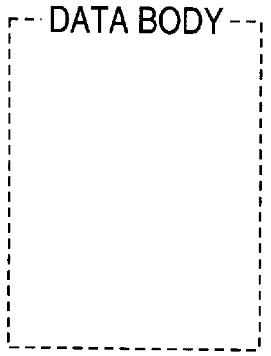

FIGS. 2 to 4 are diagrams showing the stored contents of the HDD 17. Referring to FIG. 2, the music piece data file 50 occupies an area of about 400 MB so that music piece data of 3,000 to 4,000 music pieces are stored. As shown in FIG. 2(B), each music piece data has a header into which a music piece number and a genre code are previously written. In the BGP script file 51, plural music piece BGP script data and plural genre BGP script data are stored. Each BGP script data has a configuration shown in FIG. 3 in which the procedure of combining and displaying a background still picture Bn and a foreground still picture Fn is described. A BGP script data wherein a music piece number is described in the header is a music piece BGP script data. A BGP script data wherein a genre code is described in the header is a genre BGP script data. A music piece BGP script data is read out when the music piece data of the corresponding music piece number is to be performed, and still pictures are displayed on the monitor 26 in the described procedure. When a music piece BGP script data corresponding to (the music piece number of) the music piece data which is to be performed does not exist, a music piece BGP script data corresponding to the genre of the music piece is read out. In other words, music piece BGP script data respectively corresponding to all the music piece data are not stored. With respect to old music piece data or music piece data produced for a karaoke apparatus of another type, a music piece BGP script data for such a music piece data is not stored. When such a music piece is to be performed, one of the genre BGP script data is used. The picture data file 52 occupies an area of about 260 MB so that the above-mentioned plural background and foreground still picture data are stored. About 2,000 to 3,000 scenes are stored as the still picture data. The index file 54 is a file in which the music piece data and the BGP script data are stored in correspondence with the music piece numbers. As described above, one music piece data is surely stored for each of the music piece numbers, but the BGP script data may fail to correspond to a part of the music piece numbers.

FIG. 2(B) is a diagram showing the configuration of the music piece data. Each music piece data consists of a header, the musical-tone track, a word track, a voice track, an effect control track, and a voice data section. Into the header, written are various data relating to the music piece data, such as the music piece number, the genre code, the title of the music piece, the data of issue, and the performance time (length).

Each of the tracks ranging from the musical-tone track to the effect control track is configured by sequence data consisting of plural event data and duration data Δt respectively indicating time periods between the events. When a karaoke performance is to be executed, the CPU 10 reads out data of all the tracks in parallel on the basis of a sequence program. According to the sequence program, the counting operation is conducted in accordance with a predetermined tempo clock signal, and, when the count value reaches Δt, the next event data is read out and then supplied to a predetermined processing unit.

In the musical-tone track, tracks of various parts such as a melody track and a rhythm track are formed. The word track is a track in which the sequence data for displaying words on the monitor 26 is stored. In the description of data of the word track, usually, words of one line are treated as one word display data. Each word display data consists of character data (character codes and display coordinates of the characters) of words of one line, a display time period of the words (usually, about 30 seconds), and a wipe sequence data.

The wipe sequence data is a sequence data which is used for changing the display color of the words in accordance with the progress of the performance of a music piece, and in which timings of changing the display color (the time period elapsed after the start of the display of the words) and the changing position (coordinates) are sequentially recorded over the length of one line.

The voice track is a sequence track which designates the occurrence timing of voice data n (n=1, 2, 3, . . . ) stored in the voice data section, etc. Human voices of a back chorus, a harmony song, and the like which are difficult to be synthesized by the tone generator 18 are stored in the voice data section. A voice designating data, and a duration data Δt which designates the interval of reading the voice designating data, i.e., a timing of supplying a voice data to the voice data processing unit 19 to form a voice signal, are written into the voice track. The voice designating data consists of a voice data number, a musical interval data, and a volume data. The voice data number is an identification number n of each voice data stored in the voice data section. The musical interval data and the volume data indicate the musical interval and volume of a voice data to be formed. For example, a back chorus containing no word, such as "ah" or "wawawawaa" can be used many times with changing the musical interval and the volume. When such a voice data is stored with a fundamental musical interval and a fundamental volume, therefore, the voice data are used many times with shifting the interval and the volume. The voice data processing unit 19 sets the output level on the basis of the volume data, and sets the musical interval of the voice signal by changing the interval of reading the voice data on the basis of the musical interval data. A DSP control data for controlling the effect DSP 20 is written into the effect control track. The effect DSP 20 imparts echo-like effects such as reverberation to the signals supplied from the tone generator 18 and the voice data processing unit 19. The DSP control data consists of a data designating the kind of such an effect, a data indicative of the change amount, etc.

Figure 5:
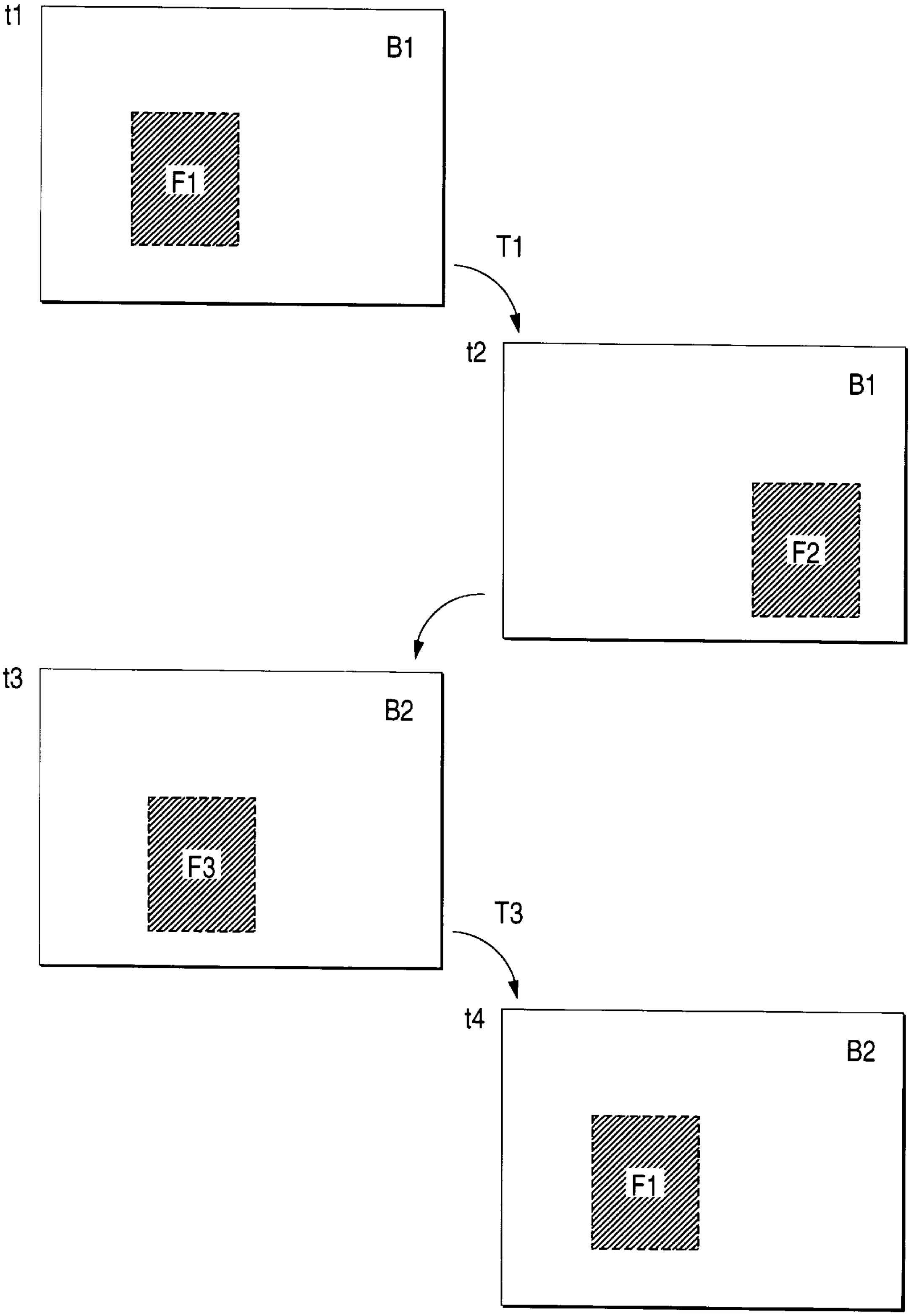
FIG. 5 is a diagram showing an example of the synthesization of a still picture data due to the BGP script data.

FIG. 3 is a diagram showing an example of the configuration of a BGP script data, and FIG. 4 is a diagram showing the configuration of a still picture data. FIG. 5 is a diagram showing an example of the switching of the display still picture data due to the BGP script data.

Referring to FIG. 3, the BGP script data consists of a header and plural script lines. A corresponding music piece number or a corresponding genre code is written into the header. A BGP script data wherein a corresponding music piece number is written into the header is a music piece BGP script data, and a BGP script data wherein a corresponding genre code is written into the header is a genre BGP script data. Alternatively, both a corresponding music piece number and a corresponding genre code may be written into the header, and one data may be used as a music piece BGP script data and a genre BGP script data. A script line is written for each switching of the display still picture. The contents described in a script line are as follows:

tn: switching time: indicated by the time period elapsed after the start of the performance;

En: kind of an effect: designating the kind of the manner (effect) of switching the screen;

xe and ye: center of the effect: designating the start point or the end point of the switching manner;

Tn: time period required for the effect: designating the time period elapsed after the start of the switching of the picture;

Bn: identification number of a background still picture: designating a background still picture data;

Fn: identification number of a foreground still picture: designating a foreground still picture data;

xf and yf: coordinates of the display of the foreground: designating the display coordinates of the upper left end of the foreground still picture data; and Ha, Sa, and La: correcting values of the tone color: correcting values for harmonizing the tone color of the background still picture data with that of the foreground still picture data.

The time tn is described in the unit of 1/30 second which is equal to one frame of the NTSC system. The manner of switching the screen includes:

cut-in: instantaneously switched;

dissolve: sections formed by finely dividing the screen are randomly switched in succession;

wipe: laterally or vertically switched;

door: switched from a designated line (a vertical line passing the center) to the lateral sides or from the lateral sides to the designated line;

shutter: switched from a designated line (a horizontal line passing the center) to the vertical sides or from the vertical sides to the designated line;

cross: switched from the center toward the outer periphery or from the outer periphery toward the center;

PinP: switched from the center toward the outer periphery or from the outer periphery toward the center;

line: vertically switched from plural designated lines; and mosaic: switched from plural centers toward the outer periphery. The value of En is allocated to each of the manners. The default is cut-in. When the screen is to be switched by cut-in, the parameters En, xe, ye, and Tn may be omitted.

The foreground display coordinates xf and yf are values in the ranges of 0 to 384 and 0 to 240, respectively. The color tone correcting values Ha, Sa, and La are correcting values of the hue, the saturation, and the lightness of each pixel (bit) of the foreground still picture data, respectively. The hue correcting value Ha has a value of −180 to 180. The correction is conducted so that the hue of each pixel is rotated clockwise on a color wheel by an angle corresponding to the designated value.

The saturation correcting value Sa has a value of −100 to 100. The saturation is corrected in the following manner. The difference between the saturation (0 to 100) which is currently designated to each pixel, and the saturation 100 is equally divided by 100 and values of 1 to 100 are allocated. The difference between the saturation which is currently designated and the saturation 0 is equally divided by 100 and values of −1 to −100 are allocated. Then, the saturation is corrected to be a value corresponding to the saturation correcting value. In the case of Sa=−100, a gray scale picture is obtained. The lightness correcting value La has a value of −100 to 100. The lightness is corrected in the following manner. The difference between the lightness (0 to 100) which is currently designated to each pixel, and the lightness 100 is equally divided by 100 and values of 1 to 100 are allocated. The difference between the lightness which is currently designated and the lightness 0 is equally divided by 100 and values of −1 to −100 are allocated. Then, the lightness is corrected to be a value corresponding to the lightness correcting value. In the case of La=100, the screen is throughly white, and, in the case of La=−100, the screen is throughly black. When the color tone is not to be corrected, these parameters are omitted. When all the parameters are zero, the correcting values are calculated on the basis of the average values of the tone colors (hue, saturation, and lightness) of the designated background and foreground still picture data, and the foreground still picture data is corrected on the basis of the calculated correcting values.

FIG. 4 shows examples of the background and foreground still picture data stored in the picture data file 52. In FIG. 4(A), the background still picture data consists of the background still picture number Bn, a genre code, an average HSL, and the data body. The background still picture number Bn is a number for identifying the picture data. A picture data is designated by the number in a BGP script. The genre code indicates the genre in which the picture data is to be used, and is the same in kind as that written into the header of a music piece data. A background still picture number Bn in a predetermined range may be allocated to each genre. In this case, it is possible to judge the genre of the background still picture data from the background still picture number Bn. The average HSL indicates average values of the hue H, the saturation S, and the lightness L of all the pixels of the data body. When the average values are previously calculated and stored, it is possible to enhance the efficiency of the operation of correcting the color tone when pictures are to be combined with each other. The data body consists of 16-bit picture data of 384×240 dots. Each picture data is configured by a picture of a landscape or a town which is suitable for the genre code.

By contrast, the foreground still picture data consists of a foreground still picture number Fn, the average HSL, and the data body. In the same manner as the background still picture number Bn, the foreground still picture number Fn is a number for identifying the picture data. A picture data is designated by the number in a BGP script. The average HSL indicates average values of the hue H, the saturation S, and the lightness L of all the pixels of the data body. The data body may be set to have an arbitrary size of 384×240 dots or less and consists of 16- or 8-bit picture data. The foreground still picture data is defined by a rectangle of the number of vertical dots×the number of horizontal dots. When some bits of the picture data are made transparent, it is possible to form a picture which has a substantially arbitrary shape.

FIG. 5 is a diagram showing the procedure of switching the display still picture data which is produced by combining the background and foreground still picture data with each other, in accordance with the example of the BGP script data shown in FIG. 3. In the procedure, the initial still picture is displayed so as to be superimposed on a title still picture showing the title of a music piece and the like or merged after the title still picture.

First, a background still picture data of No. B1 and a foreground still picture data of No. F1 are designated in the first line of the script lines. The tone color correcting value is omitted, and hence the still picture data are combined at the coordinates of x1 and y1 without correction, thereby producing a display still picture data. The effect parameter is omitted. Therefore, the display switching is cut-in, and the display still picture data is immediately displayed at time t1.

Next, the background still picture data of No. B1 and a foreground still picture data of No. F2 are designated in the second line of the script lines. Values of −30, −50, and 40 are written as the tone color correcting values. The foreground still picture data is corrected in accordance with the correcting values. The method of correcting the data will be described later in detail. The corrected foreground still picture data is combined with the background still picture data at the coordinates of x2 and y2, thereby producing a display still picture data. E1 is written as the effect parameter, and hence the still picture data is switched in the effect corresponding to the parameter over a time period T1 starting from time t2. The background still picture data is not changed (B1). When the display switching is conducted, therefore, it is seen that only the foreground is switched from F1 to F2.

In the third line of the script lines, a background still picture data of No. B2 and a foreground still picture data of No. F3 are designated. The tone color correcting value is omitted, and hence the still picture data are combined at the coordinates of x3 and y3 without correction, thereby producing a display still picture data. The effect parameter is omitted. Therefore, the display switching is cut-in, and the display still picture data is immediately displayed at time t3.

Next, the background still picture data of No. B2 and the foreground still picture data of No. F1 are designated in the fourth line of the script lines. Values of 0, 0, and 0 are written as the tone color correcting values. The tone color correcting values indicate that the correction is to be conducted while the correcting values are to be calculated in real time. Therefore, the correcting values are calculated on the basis of the average value of the color tones of the background and foreground still picture data. The foreground still picture data is corrected in accordance with the correcting values. The corrected foreground still picture data is combined with the background still picture data at the coordinates of x4 and y4, thereby producing a display still picture data. E2 is written as the effect parameter, and hence the still picture data is switched in the effect corresponding to the parameter over a time period T3 starting from time t4.

When the same background and foreground still picture data are used and the combining position where the foreground still picture data is to be combined is gradually shifted, an object in the foreground may be animated so as to appear as if it is moving.

Figure 6:
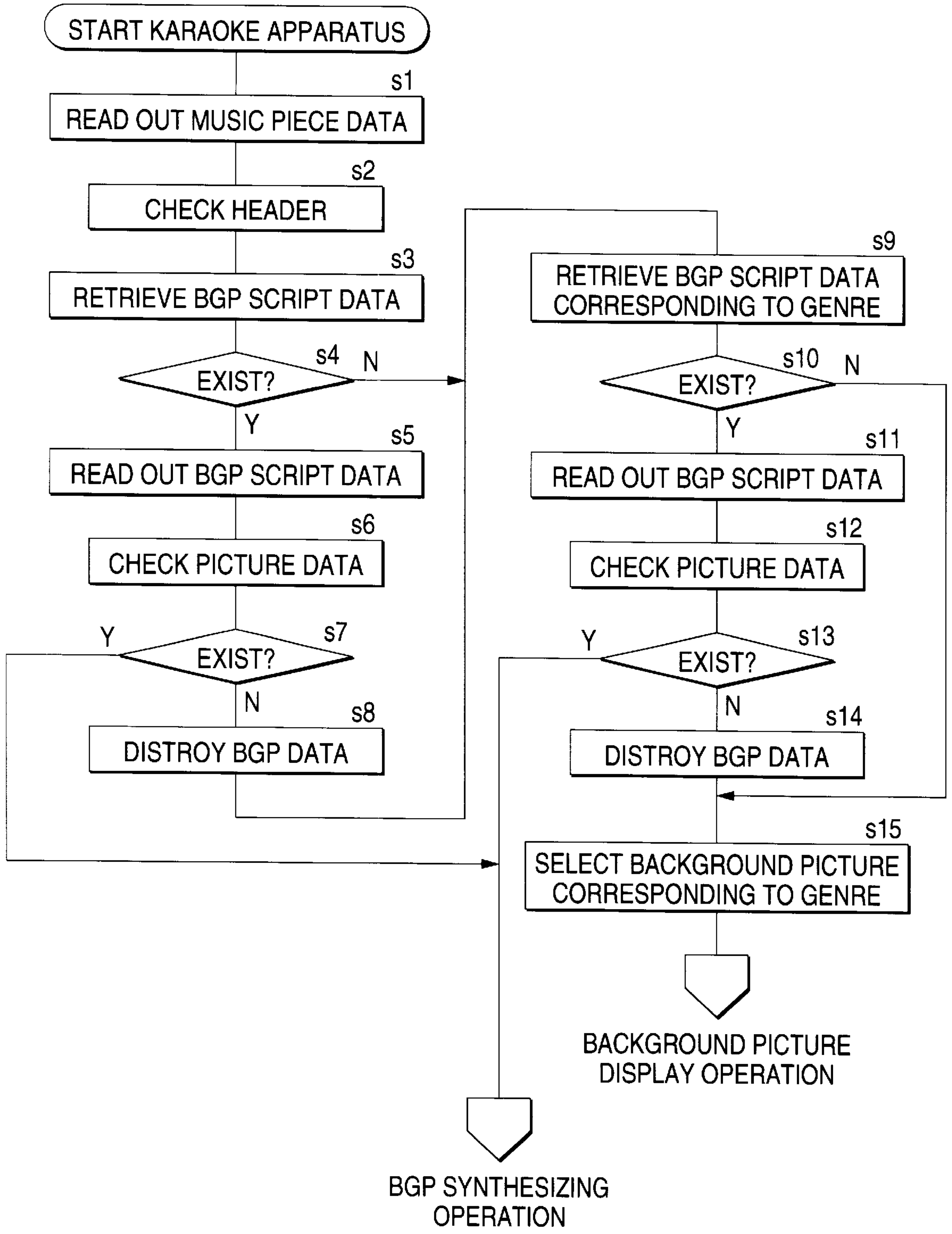
FIG. 6 is a flowchart showing the operation of the karaoke apparatus.

FIGS. 6 to 9 are flowcharts showing the picture display operation of the karaoke apparatus. FIG. 6 shows the operation conducted when a karaoke performance is started. When the user selects a music piece, a search is performed on the index file 54 by using the music piece number and the designated music piece data is read out from the HDD 17 to the RAM 12 (s1). The header of the read out music piece data is checked to read the genre code and the like (s2). The BGP script data corresponding to the music piece number is retrieved from the index file 54 (s3). If a BGP script data corresponding to the music piece exists (s4), the music piece BGP script data is read out (s5), and it is checked whether all still picture data used in the BGP script exist in the picture data file or not (s6). If all the still picture data exist (s7), the process proceeds to a BGP synthesizing operation shown in FIGS. 7 and 8.

By contrast, if the search on the index file 54 by using the designated music piece number shows that no corresponding music piece BGP script data exists (s4), the process proceeds to s9, and a genre BGP script data corresponding to the genre of the music piece is retrieved (s9). If a part of the still picture data used in the BGP script does not exist (s7), the read out music piece BGP script data is discarded (s8), and the genre BGP script data corresponding to the genre of the music piece is retrieved (s9). Usually, genre BGP script data are stored in correspondence with all the genres, respectively. Therefore, a genre BGP script data corresponding to the genre of the music piece is retrieved (s10). The retrieved genre BGP script data is read out (s11), and it is checked whether all the still picture data used in the BGP script exist in the picture data file or not (s12). If all the still picture data exist (s13), the process proceeds to the BGP synthesizing operation shown in FIGS. 7 and 8.

If a part of the still picture data used in the genre BGP script data does not exist (s13), the genre BGP script data cannot be used, and hence this data is discarded (s14). A background still picture data corresponding to the genre of the music piece is selected from the picture data file (s15). In this case, background still picture data of plural scenes are selected in accordance with the performance time period of the karaoke music piece. Thereafter, the process proceeds to a background picture display operation of FIG. 9.

Figure 7:
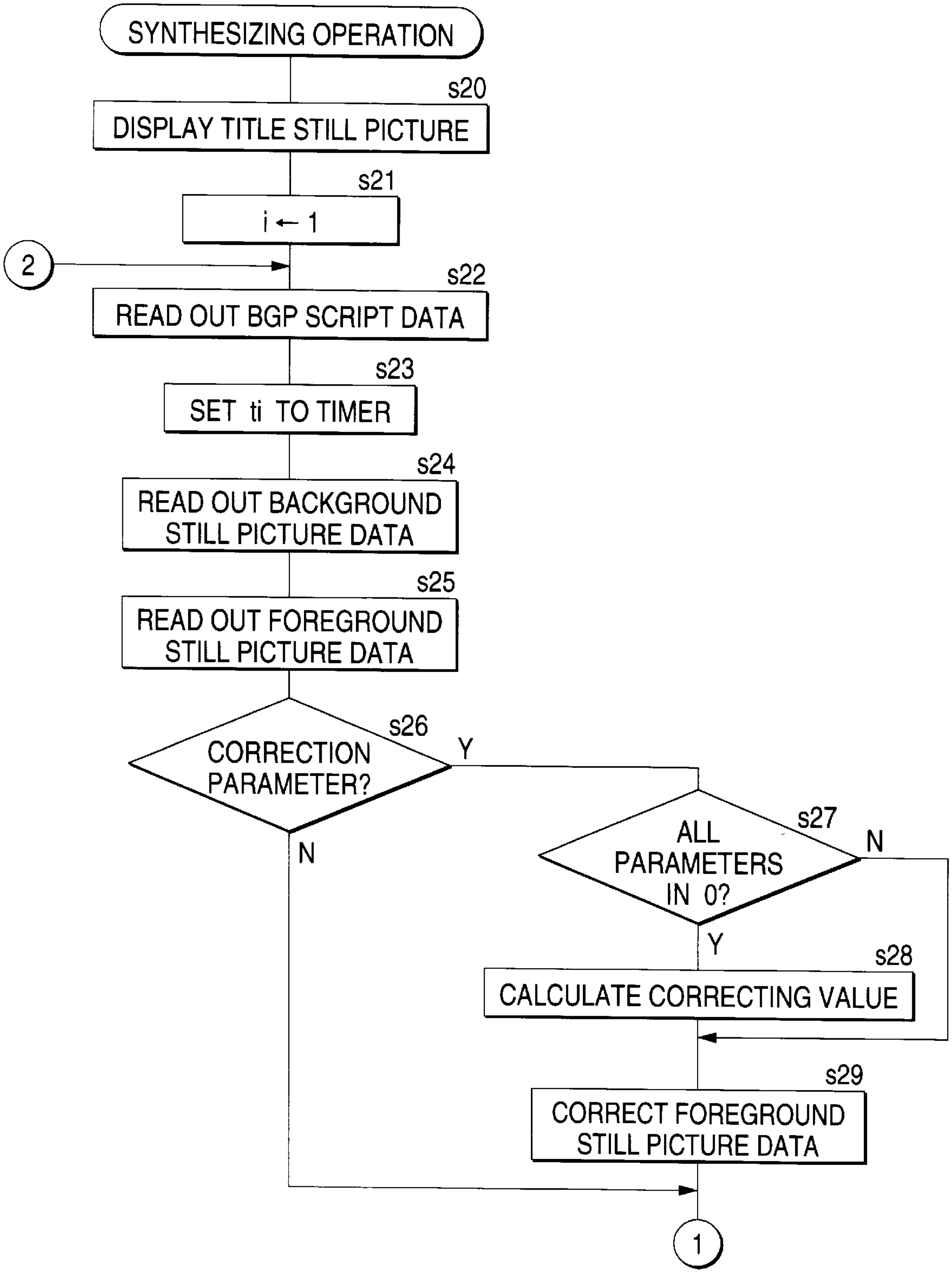
FIG. 7 is a flowchart showing the operation of the karaoke apparatus.
Figure 8:
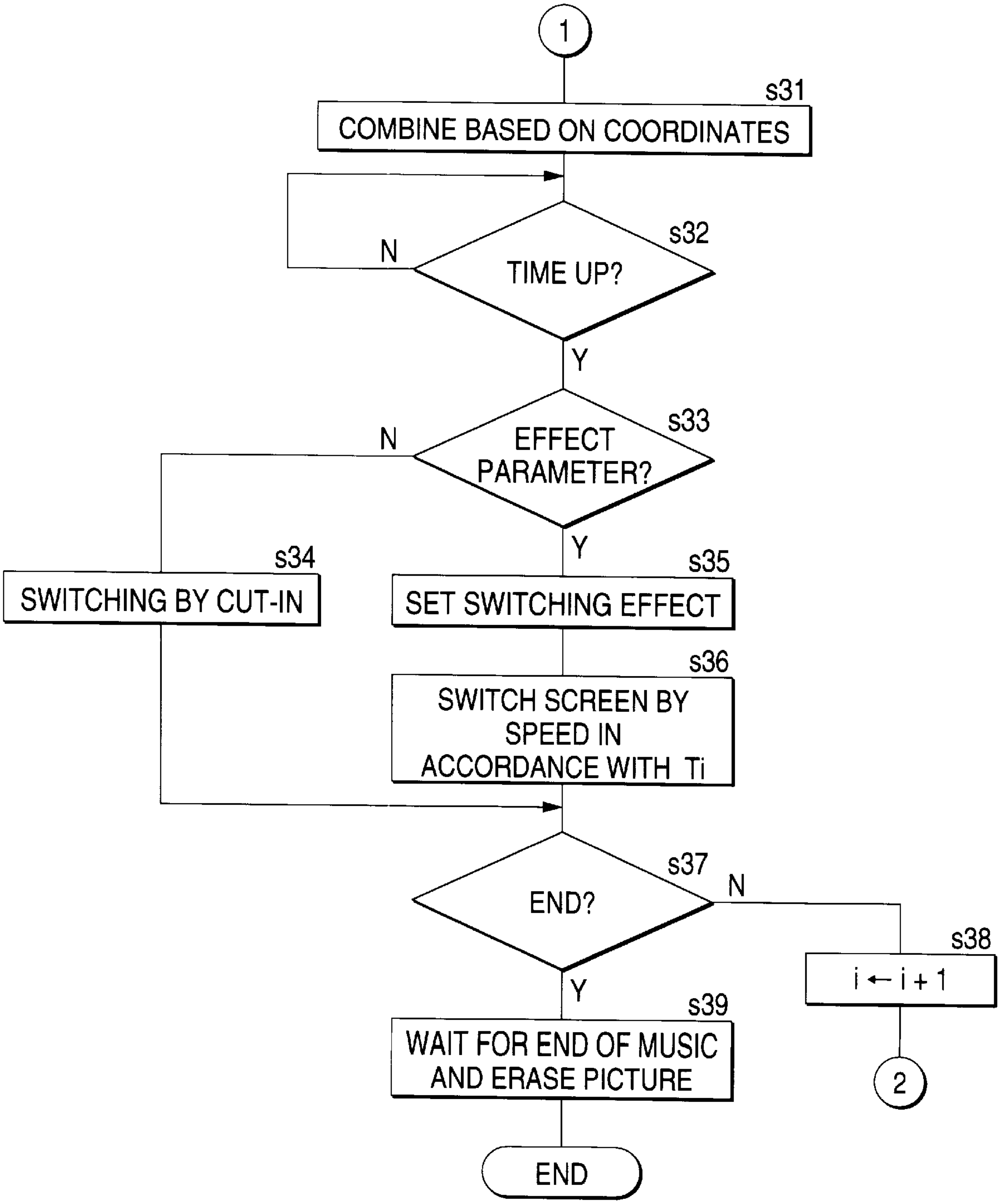
FIG. 8 is a flowchart showing the operation of the karaoke apparatus.

FIGS. 7 and 8 are flowcharts showing the BGP synthesizing operation. When the performance of the karaoke music piece is started, the title still picture is first displayed (s20). During the display of the title still picture, a pointer i of the script is set to be 1 (s21), and an i-th script line counted from the BGP script data is read out (s22). A timing data ti described in the script line is set to a timer (s23), and, while ti is counted, the designated background and foreground still picture data are read out (s24 and s25). Next, it is judged whether the script line contains correction parameters or not (s26). If there is no correction parameters, the process directly proceeds to s31. If there is correction parameters, it is judged whether all the parameters are zero or not (s27). If any of the parameters is not zero, the process proceeds to s29 in order to correct the foreground still picture data with using the values of the parameters. In contrast, if all the parameters are zero, this means that the correcting values are to be calculated on the basis of the average HSL of the background still picture data and the average HSL of the foreground still picture data. Therefore, the correcting values are calculated on the basis of the average of the HSL contained in the headers of the read out background and foreground still picture data (s28). The correcting value calculating operation is conducted in the following manner. First, the HSL averages Hb, Sb, and Lb of the background still picture data, and the HSL averages Hf, Sf, and Lf of the foreground still picture data are read out from the headers of the still picture data, and their averages h, s, and l are calculated. Thereafter, the difference (h−Hf, s−Sf, and l−Lf) between the averages h, s, and l of the two data and the HSL averages Hf, Sf, and Lf of the foreground still picture data are set as the correcting values Ha, Sa, and La. In s29, the tone color of the foreground still picture is corrected on the basis of the correcting values. The correcting operation is conducted in the following manner. The foreground still picture data is stored in the form of an RGB data. First, therefore, the data is converted into an HSL data. Since the hue correcting value Ha has a value of −180 to +180, a corrected hue is obtained by rotating the hue H of each pixel of the foreground still picture data by an angle of the value. The saturation correcting value Sa has a value of −100 to +100. When the saturation correcting value Sa is minus, the difference between 0 and the current saturation S is equally divided for each pixel by 100, and a value of the rate of the saturation correcting value Sa is set as the corrected saturation. When the saturation correcting value Sa is plus, the difference between the current saturation S and 100 is equally divided for each pixel by 100, and a value of the rate of the saturation correcting value Sa is set as the corrected saturation. The lightness correcting value La has a value of −100 to +100. When the lightness correcting value La is minus, the difference between 0 and the current lightness L is equally divided for each pixel by 100, and a value of the rate of the lightness correcting value La is set as the corrected lightness. When the lightness correcting value La is plus, the difference between the current lightness L and 100 is equally divided for each pixel by 100, and a value of the rate of the lightness correcting value La is set as the corrected lightness. Thereafter, the process proceeds to s31.

In s31, the foreground still picture data is combined with the background still picture data, relative to the foreground display coordinates xf and yf, thereby producing the display still picture data. Then, the process waits until time t1 is counted up (s32). When time t1 is counted up, it is judged whether an effect parameter En is described in the script line or not (s33). If an effect parameter En is not described, the switching is immediately conducted by cut-in (s34). If an effect parameter En is described, an effect (switching manner) indicated by the parameter is set (s35). The screen is switched from the previous still picture data to the current still picture data over a time period Ti (s36). It is judged whether the BGP script data is ended in the current script line or not (s37). If the data is not ended, i is incremented by 1 (s38) and the process returns to s22. If the data is ended, the process waits for the end of the music piece and then erases the still pictures which are currently displayed (s39), and the operation is ended. When ti in each script line describes a time period elapsed after the execution of the immediately previous script, the operation is conducted as described above. When ti describes a time period elapsed after the start of the music piece, $ti-t_{(i-1)}$ is set in the timer.

Figure 9:
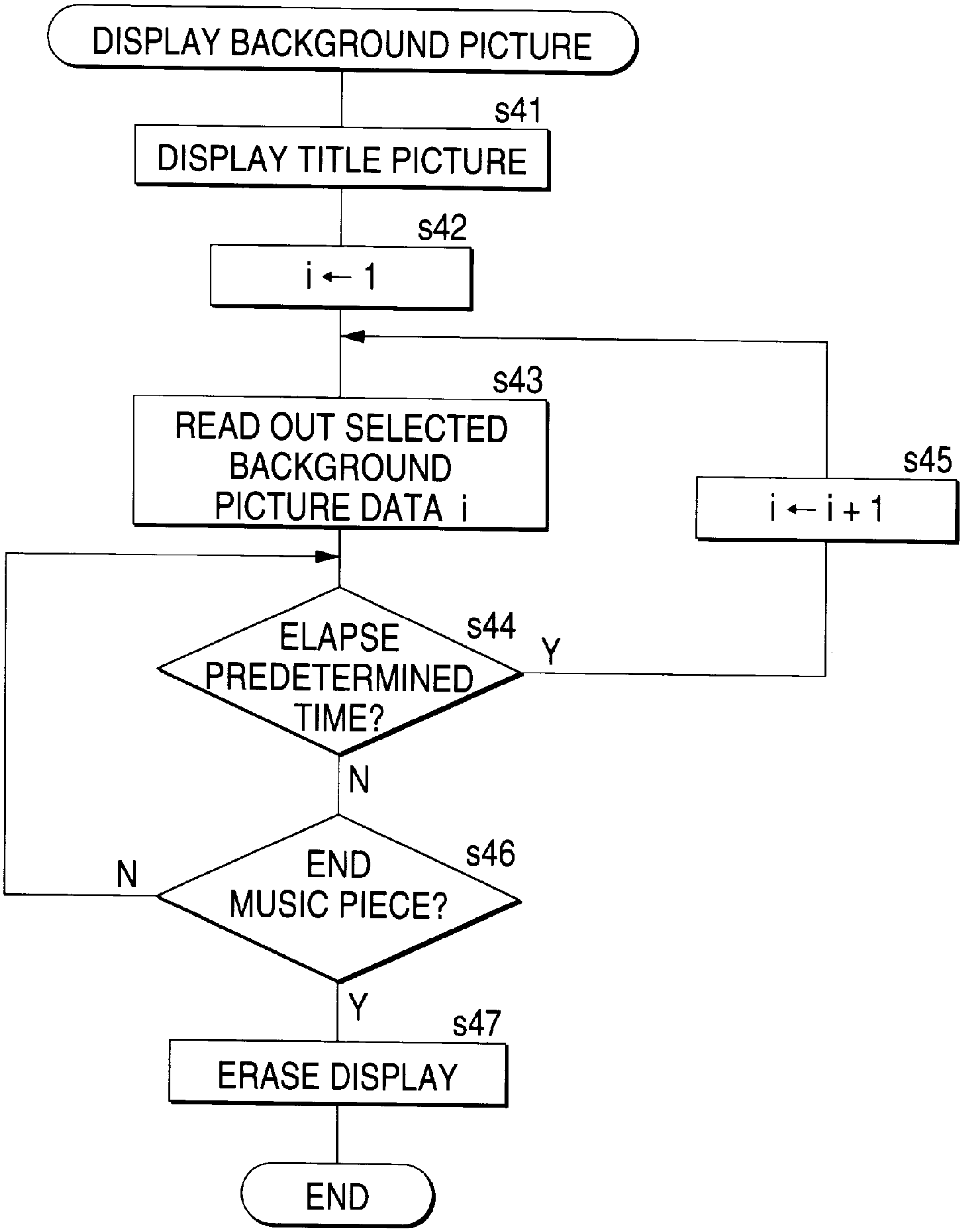
FIG. 9 is a flowchart showing the operation of the karaoke apparatus.

FIG. 9 is a flowchart showing the still picture display operation. The operation is executed when a BGP script data corresponding to the genre of a music piece to be performed does not exist. First, the title still picture is displayed (s41). After the display of the title still picture, a pointer i is set to be 1 (s42), and an i-th data of the selected background still picture data is read out to be displayed (s43). While displaying the background still picture data, the process waits until a predetermined time period (about 30 seconds) has elapsed (s44) or until the music piece is ended (s46). When the predetermined time period has elapsed, i is incremented by 1 (s45) and the process returns to s43 in which the next background still picture data is read out to be displayed. If the music piece is ended, the display on the monitor 26 is erased (s47) and the operation is then ended.

In the embodiment, one foreground still picture data is combined with the background still picture data. Alternatively, plural foreground still picture data may be combined. The tone color correction may be conducted on not only the foreground still picture data but also the background still picture data. In the operation described above, the HSL averages Hb, Sb, and Lb of the background still picture data, and the HSL averages Hf, Sf, and Lf of the foreground still picture data are read out from the headers of the still picture data, and their averages are then obtained. In the case where Hb, Sb, and Lb, and Hf, Sf, and Lf are not previously stored, with respect to the hue H, the saturation S, and the lightness L, values of all pixels of the still picture data may be averaged in real time, and the thus obtained averages may be used.

According to the present invention, picture sequence data respectively corresponding to plural music piece data, and background and foreground still picture data designated by the picture sequence data are stored separately from the music piece data, each of these data is designated by the index file, and the designated data is read out. Therefore, a picture in which background and foreground still picture data are combined with each other can be displayed by using music piece data which are used in a conventional karaoke apparatus, as they are. Even when a part of the data is destroyed, or when music piece data or picture sequence data are to be replaced or the combination of the data is to be changed in order to update the data, it is required only to conduct such an operation on the data to be replaced, so as to update the index file. Therefore, the work can be simplified and the maintenance can be easily conducted.

According to the present invention, picture sequence data corresponding to music piece data, and those corresponding to genres of music pieces are previously stored. In the case of a music piece in which both a music piece data and a picture sequence data are registered, a picture can be displayed by using the picture sequence data corresponding to the music piece. In the case of a music piece in which only a music piece data is registered, an image can be provided by using a picture sequence data of a corresponding genre. Therefore, it is possible to operate a karaoke apparatus in which music pieces having a registered picture sequence data corresponding to the music piece, and music pieces not having such a data are mixedly used. In other words, new music pieces having a picture sequence data which is produced at the same time as the music piece data, and old music pieces not having such a data can be mixedly used. Furthermore, music pieces having a picture sequence data which is produced for the karaoke apparatus, and those having a picture sequence data which is produced for another karaoke apparatus can be mixedly used. Consequently, it is possible to broaden the range of music piece data which can be used.

According to the present invention, when a picture sequence data corresponding to a music piece data or the genre of the music piece does not exist, background still picture data corresponding to the genre of the music piece data are displayed while suitably switching over the data, during the performance of the music piece. Even in an emergency case, therefore, a situation where no picture is displayed on the monitor does not occur.

What is claimed is:

1. A karaoke apparatus in which said karaoke apparatus stores a plurality of music piece data respectively corresponding to music pieces, each of said music piece data including a genre data and a performance sequence data of a corresponding music piece, and which executes a performance of a karaoke music piece by reading out a designated music piece data, said karaoke apparatus comprising:

a picture storing unit for storing a plurality of background still picture data and a plurality of foreground still picture data;

a picture sequence data storing unit for storing a plurality of picture sequence data in which a plurality of picture designating data are arranged in time series, in correspondence with said plurality of music piece data, each of said picture designating data simultaneously designating at least one background still picture data and at least one foreground still picture data;

a picture sequence data selecting unit for, when a music piece data is designated, retrieving a picture sequence data corresponding to said music piece data from said picture sequence data storing unit, and, if said picture sequence data exists, selecting said picture sequence data, and, if said picture sequence data does not exist, retrieving a picture sequence data corresponding to the genre of said music piece data from said picture sequence data storing unit, and selecting said picture sequence data; and a picture synthesizing unit for, in parallel with a performance of said karaoke music piece, reading a picture designating data from said selected picture sequence data, and for combining a background still picture data and a foreground still picture data which are designated by said picture designating data, thereby producing display still picture data, and supplying said display still picture data to a monitor.

2. A karaoke apparatus according to claim 1, wherein each of said background still picture data is provided with a genre data, and said apparatus further comprising:

temporary picture supplying unit for supplying background still picture data corresponding to the genre of said music piece data to said monitor, while suitably switching over said background still picture data, when a picture sequence data corresponding to the genre of said designated music piece data does not exist in said picture sequence data storing unit, or when said picture sequence data cannot be used.

3. A method for performing a karaoke music piece in which a karaoke apparatus stores a plurality of music piece data respectively corresponding to music pieces, each of said music piece data including a genre data and a performance sequence data of a corresponding music piece, and which executes a performance of a karaoke music piece by reading out a designated music piece data, the method comprising the steps of:

storing a plurality of background still picture data and a plurality of foreground still picture data;

storing a plurality of picture sequence data in which a plurality of picture designating data are arranged in time series, in correspondence with said plurality of music piece data, each of said picture designating data simultaneously designating at least one background still picture data and at least one foreground still picture data;

when a music piece data is designated, retrieving a picture sequence data corresponding to said music piece data, and, if said picture sequence data exists, selecting said picture sequence data, and, if said picture sequence data does not exist, retrieving a picture sequence data corresponding to the genre of said music piece data, and selecting said picture sequence data;

reading a picture designating data from said selected picture sequence data in parallel with a performance of said karaoke music piece;

combining a background still picture data and a foreground still picture data which are designated by said picture designating data, thereby producing display still picture data; and supplying said display still picture data to a monitor.

* * * * *